US012794316B2

(12) United States Patent
Tiusanen

(10) Patent No.: US 12,794,316 B2
(45) Date of Patent: Nov. 10, 2026

(54) METHOD AND EQUIPMENT TO PRODUCE ELECTRIC ENERGY FROM KINETIC ENERGY

(71) Applicant: JPTUF OY, Kangasala (FI)

(72) Inventor: Jukka-Pekka Tiusanen, Kangasala (FI)

(73) Assignee: JPTUF OY, Kangasala (FI)

( * ) Notice: Subject to any disclaimer, the term of this patent is extended or adjusted under 35 U.S.C. 154(b) by 135 days.

(21) Appl. No.: 18/726,841

(22) PCT Filed: Jan. 3, 2023

(86) PCT No.: PCT/FI2023/050004
§ 371 (c)(1),
(2) Date: Jul. 5, 2024

(87) PCT Pub. No.: WO2023/131745
PCT Pub. Date: Jul. 13, 2023

(65) Prior Publication Data

US 2025/0167631 A1 May 22, 2025

(30) Foreign Application Priority Data

Jan. 7, 2022 (FI) ..................................... 20225012

(51) Int. Cl.
*H02K 7/18* (2006.01)

(52) U.S. Cl.
CPC ................................. *H02K 7/1853* (2013.01)

(58) Field of Classification Search
CPC .................................................... H02K 7/1853
See application file for complete search history.

(56) References Cited

U.S. PATENT DOCUMENTS

2003/0034652 A1 2/2003 Slatkin
2010/0117374 A1* 5/2010 Geletka ................ H02K 7/1853 290/1 R
2013/0271063 A1 10/2013 Wilson et al.

FOREIGN PATENT DOCUMENTS

CN 203834722 U 9/2014
CN 112535838 A 3/2021
GB 2461860 A 1/2010

OTHER PUBLICATIONS

Finnish Patent and Registration Office, International Preliminary Report on Patentability, Application No. PCT/FI2023/050004, mailed Apr. 11, 2024, 7 pages.

(Continued)

*Primary Examiner* — Viet P Nguyen
(74) *Attorney, Agent, or Firm* — Ziegler IP Law Group, LLC.

(57) ABSTRACT

A method to produce electric energy from kinetic energy. The mass is loads repeatedly the moving element of the apparatus, the gravity of the mass moves the moving element or the last part of the movement chain a certain movement distance, the potential energy that is freed during the movement is stored to a spring that is loaded by the moving element, the spring(s) push the moving element to its starting position as the effect of the mass ceases, each movement transfer organ fixed to the moving element or the frame is adapted to transfer the to and fro movement of the moving element into a rotation movement to the wheel that has been fixed to in the frame and in the moving element, the rotation movement of each wheel is transferred directly or per gear to the generator where it is changed into electric energy.

7 Claims, 5 Drawing Sheets

(56) References Cited

OTHER PUBLICATIONS

Figure 1A:
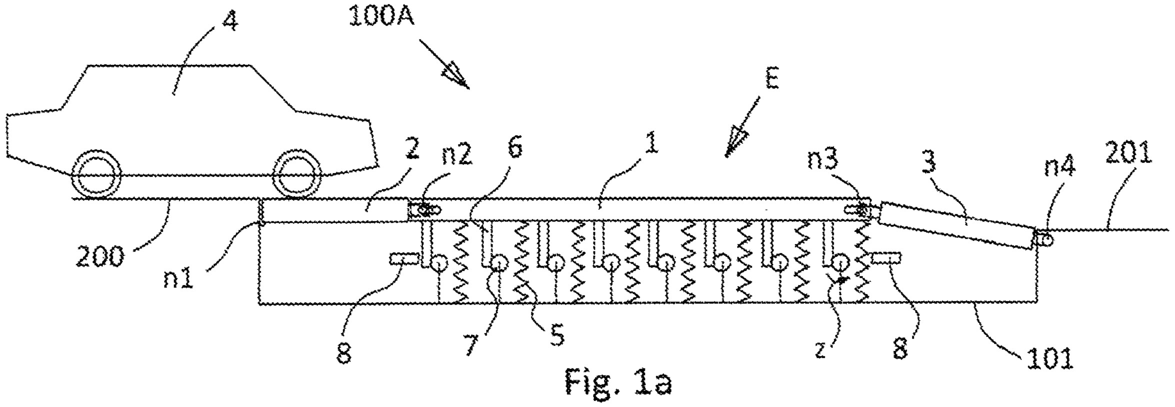

Finnish Patent and Registration Office, International Search Report, Application No. PCT/FI2023/050004, mailed Apr. 6, 2023, 7 pages.
Finnish Patent and Registration Office, Written Opinion of the International Searching Authority, Application No. PCT/FI2023/050004, mailed Apr. 6, 2023, 12 pages.

* cited by examiner

METHOD AND EQUIPMENT TO PRODUCE ELECTRIC ENERGY FROM KINETIC ENERGY

The object of this invention is a method and equipment to produce electric energy from kinetic energy.

The meaning of the invention is to utilize the masses of the vehicles in the production of the electric energy in such road points where the speed of the vehicles is naturally low. The meaning of the invention is also to utilize the masses of the people in such situations where the gravity caused movement in certain known apparatuses has not been utilized earlier to produce the electric energy. Additionally, it is the meaning of the invention to utilize the kinetic energy of some apparatuses that has not before been used for the production of the electric energy.

Advantageous usage locations of the invention are among other things the drive-in ways and the drive-out ways out of parking halls and parking areas and their ways between the platforms and among other things the shock absorbers.

When using the invention, the everyday situations are utilized in a completely new way. For instance, in one application of the invention the driving in or out of a vehicle like a car to or from a parking hall produces electric energy in two different phases repeatedly by the circling of the equipment according to the invention. In the first phase the energy that is transferred into electric energy is obtained from the potential energy that is in the cars because of their positions where the source is then the gravity and in the second phase from the potential energy that is stored as spring energy in the springs as it is released from the cars in the mentioned first phase. In the before mentioned driving in and out situations, the vehicle is positioned into a favorable position with regard of the invention before it arrives to the equipment where it is directed to lower down and its potential energy I transferred into electric energy.

When the invention is utilized in its other application with a platform that changes its vertical position, the position of the vehicle is already favorable relative to the utilization of the invention and there is no need to change it before the vehicle arrives on the apparatus. The favorable utilizations of this application of the invention are among others things the ramps between the platforms in the parking houses.

The investment costs and other usage costs are caused also in these before mentioned electric energy production ways but the transfer energy acquisition costs are not caused to the holder when using the invention.

In one application of the invention, the potential energy basing on the gravity is utilized that changes into the kinetic energy among other things in the shock absorbers and the bounce carpets. In the before mentioned, the mass effected by the gravity is the mass of the vehicle and its load and in the latter one the mass of a person.

In the patent publication US2020373811 there has been presented a method to get kinetic energy from the gravity when a vehicle moves downhill and how to change this energy into the electric energy. In this solution, the downhill is a natural hill in nature.

The greatest disadvantages of the before stated known technique are related to that in order to produce electric energy from the gravity, a natural downhill is needed and thus suitable places for production are very limited. In this case, the lorry and the truck halls to be used ought to be located on hill tops in order to be able to utilize free of charge energy.

To compare other applications of the known technology solutions with the invention solutions that have been stated before is difficult because it is difficult to find parallels.

The intention of this invention is to establish such a method and equipment to produce electric energy from the kinetic energy that avoids the disadvantages of the known technology and to improve the production of the electric energy.

The greatest advantage of the invention can be regarded in relation to the known technique to be that its method can be applied in numerous places where the potential energy gain cycles are repeated through the natural moving of the people abundantly daily, from hour to hour.

A big advantage is obtained using the invention as the energy produced is carbon free produced energy.

Figure 1B:
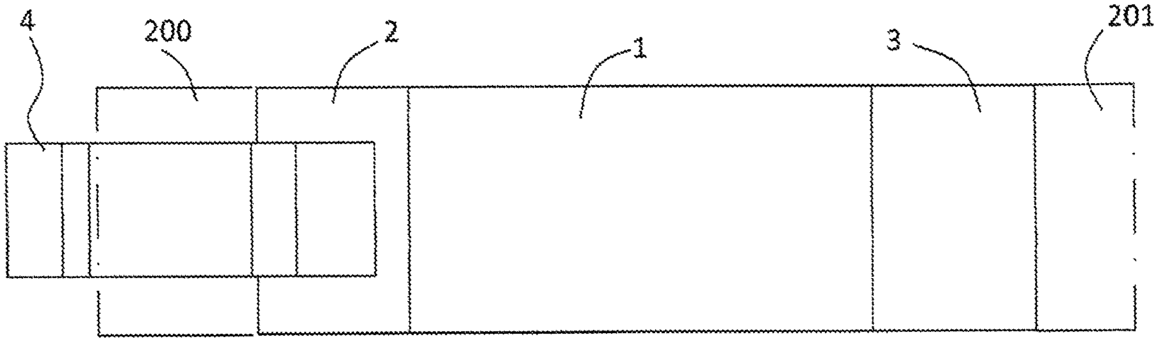
Figure 1C:
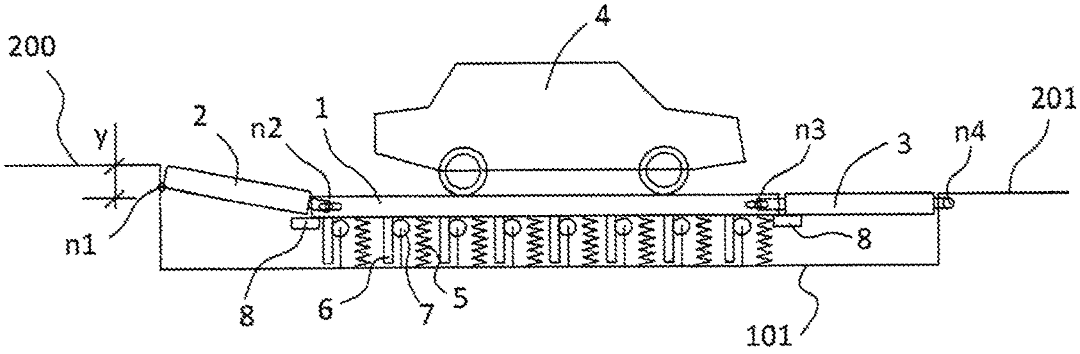
Figure 1D:
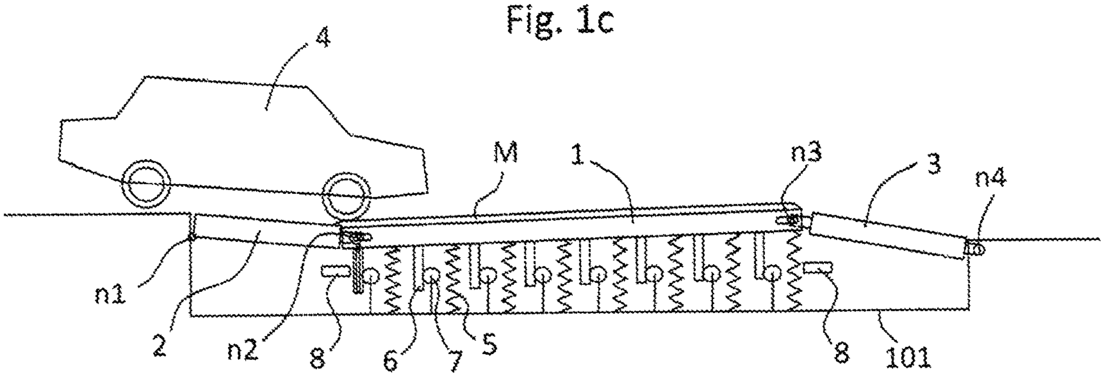
Figure 2A:
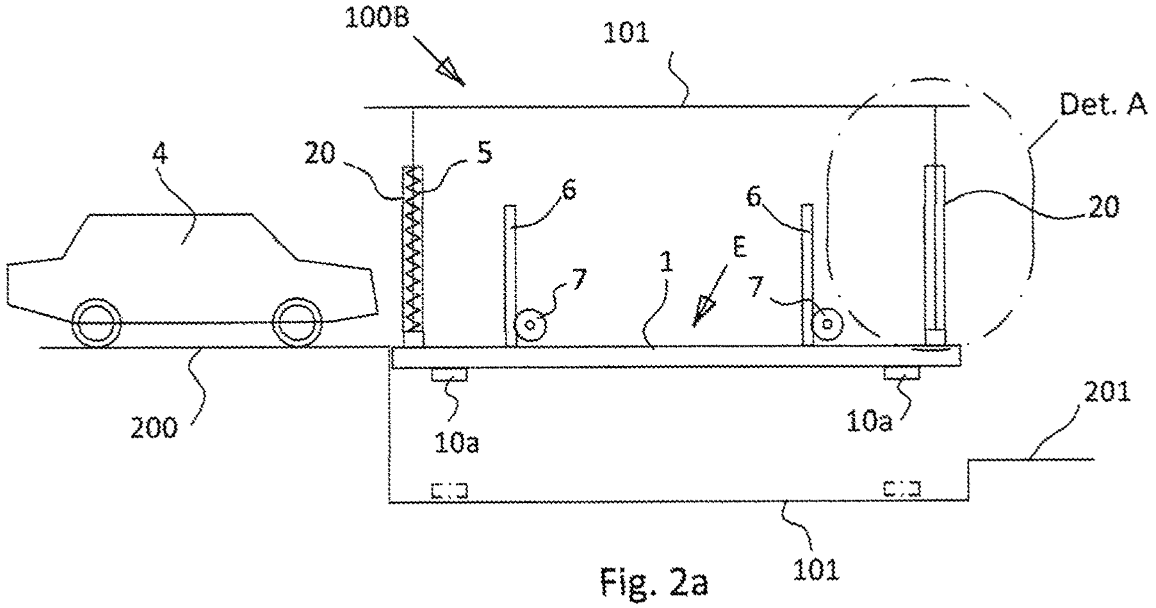
Figure 2B:
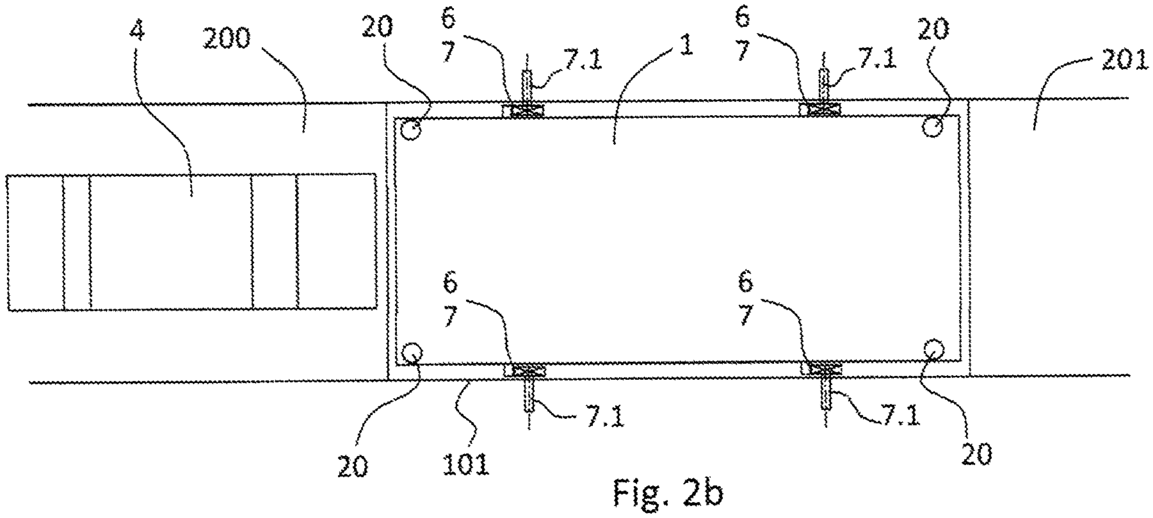
Figure 2C:
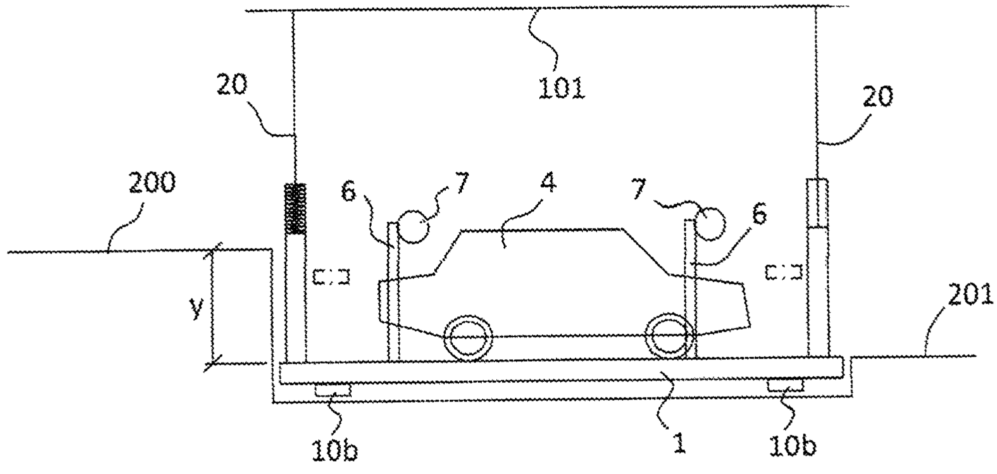
Figure 3A:
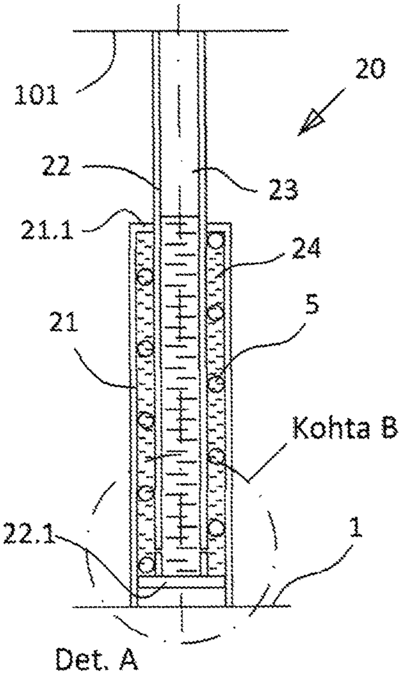
Figure 3B:
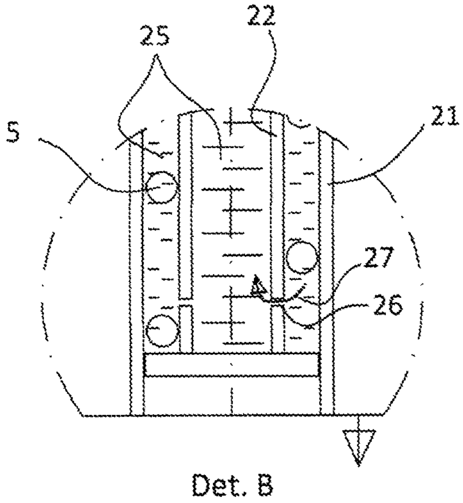
Figure 4A:
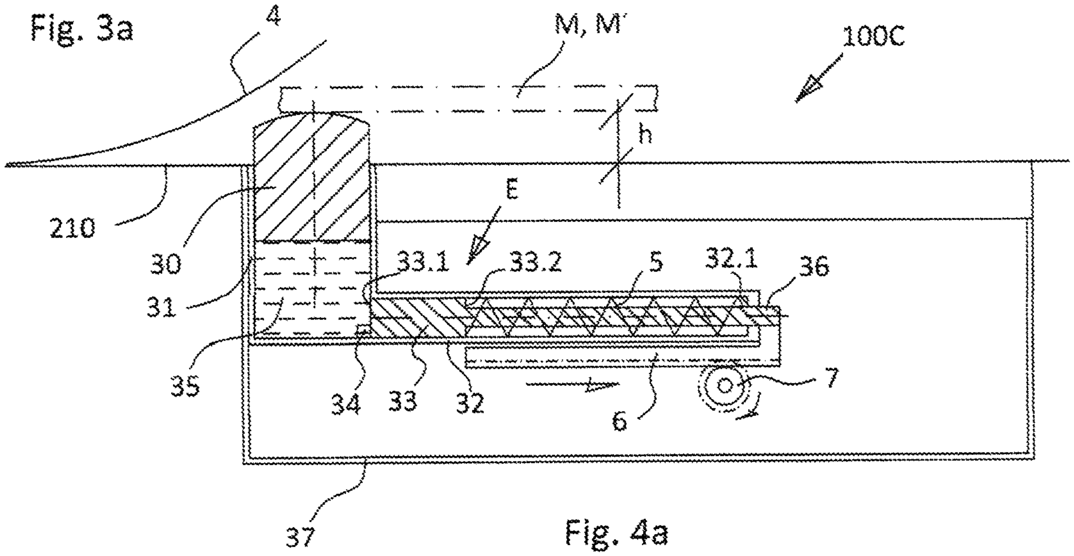
Figure 4B:
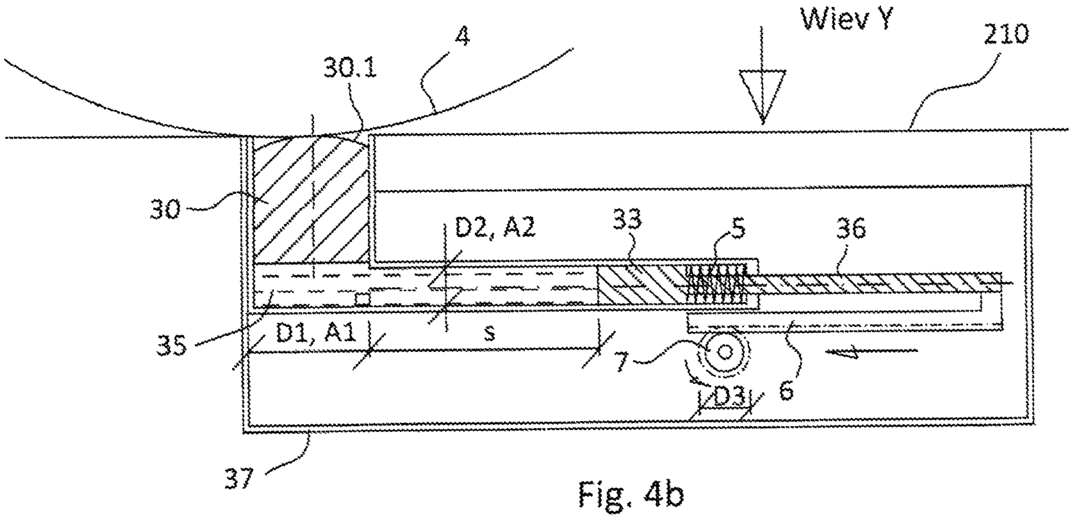
Figure 4C:
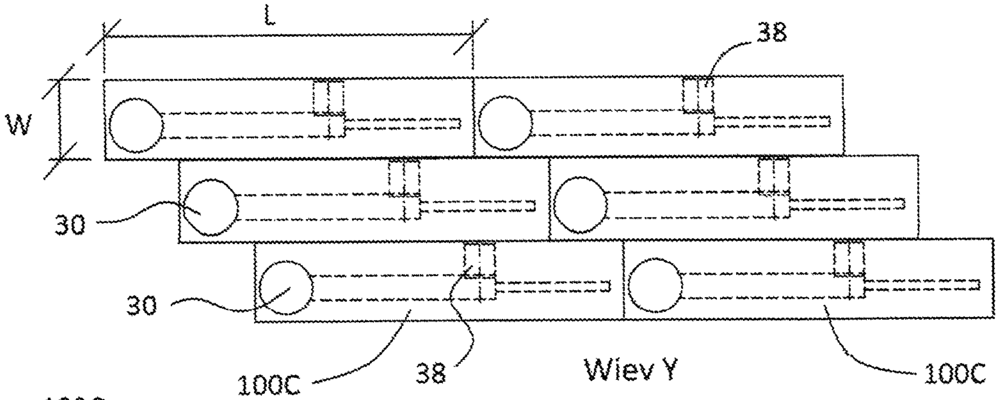
Figure 4D:
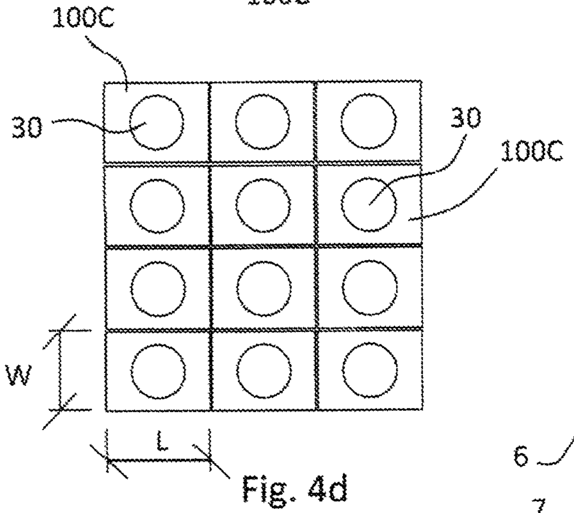
Figure 5A:
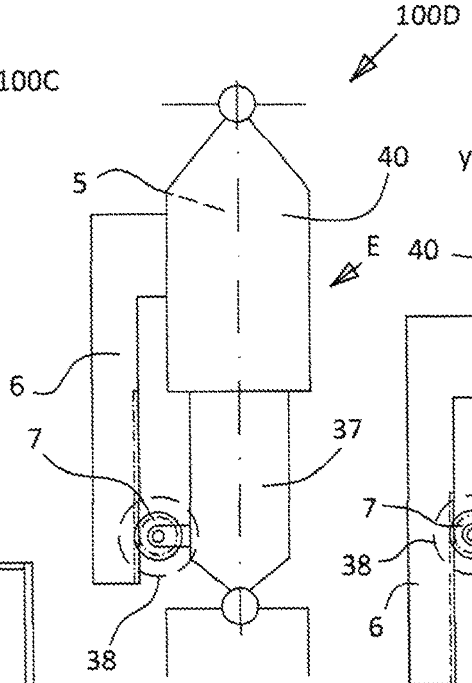
Figure 5B:
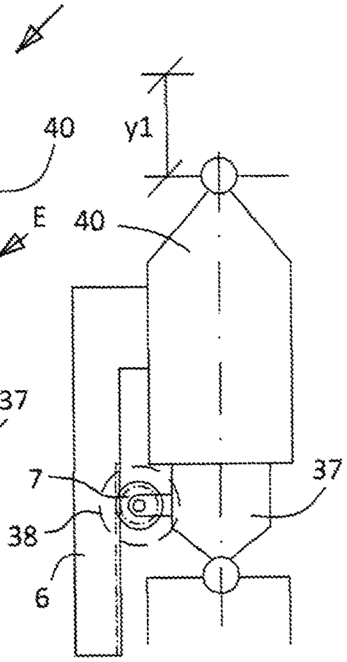
Figure 6A:
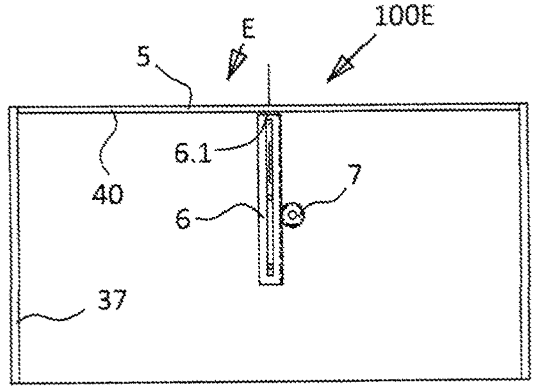
Figure 6B:
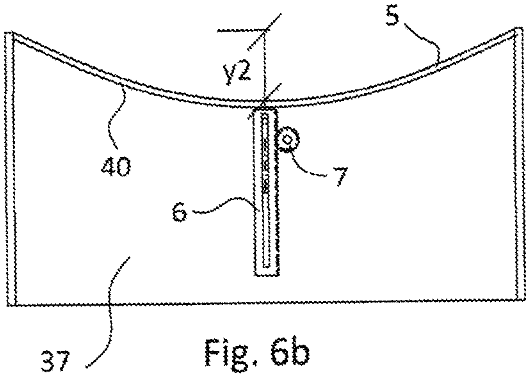
Figure 6C:
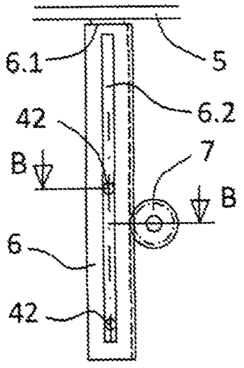
Figure 6D:
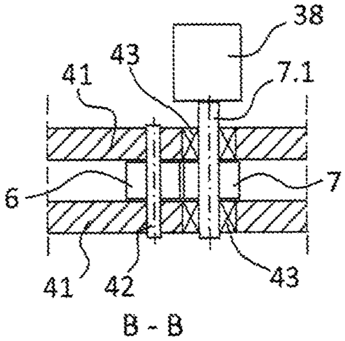
Figure 7:
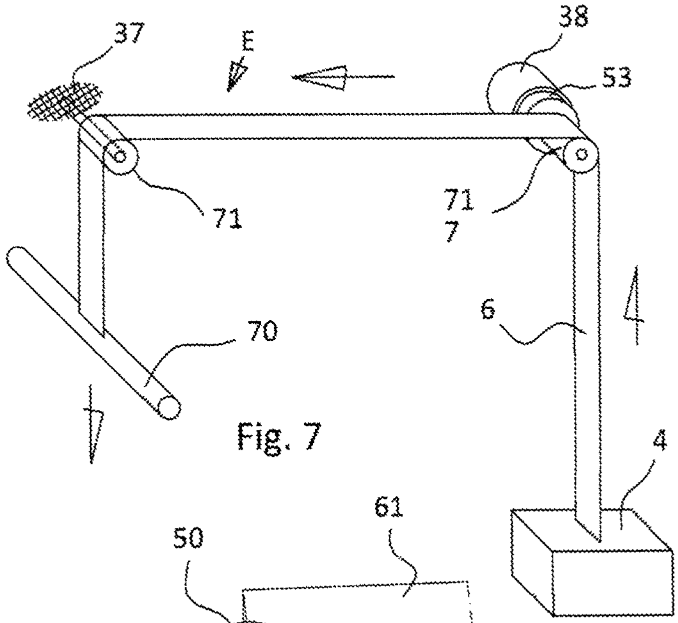
Figure 8A:
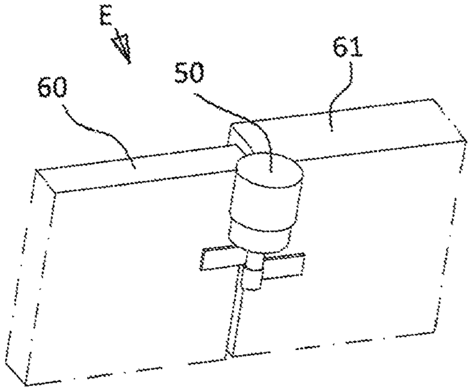
Figure 8B:
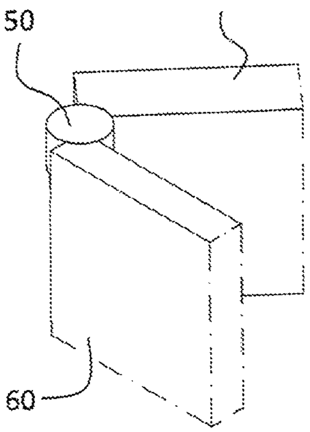
Figure 8C:
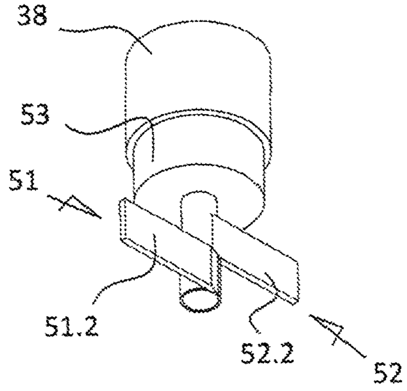
Figure 8D:
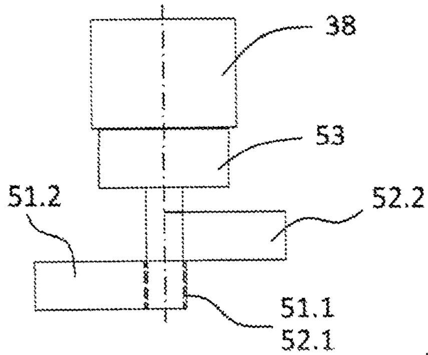
Figure 9:
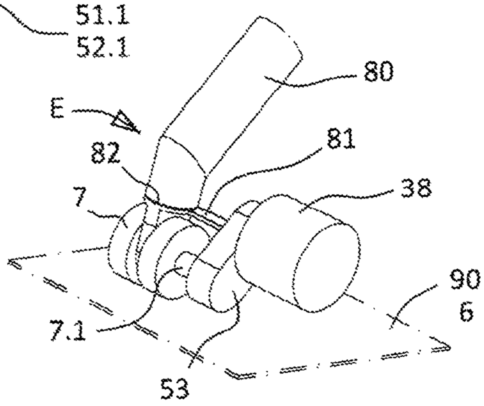

The invention will be described more closely in the enclosed drawings, where,

FIGS. 1*a* and 1*b* present one invention method application cycle starting position from side and from above, FIGS. 1*c* and 1*d* present the positions of the before mentioned cycle in its end and during it, FIGS. 2*a*-2*c* present the corresponding cycles of another application of the invention, its phases and view, as FIGS. 1*a*-1*c* before, FIGS. 3*a*-3*b* present the multi function organ connected to the before mentioned applications of the invention, FIGS. 4*a*-4*d* present a third application of the invention, FIGS. 5*a*-5*b* present a fourth application of the invention, FIGS. 6*a*-6*d* present a fifth application of the invention, FIG. 7 presents a sixth application of the invention, FIGS. 8*a*-8*d* present an application of the invention that is different from the previous ones, FIG. 9 presents another application that is different from the previous ones.

Next, the mentioned advantageous applications of the invention will be explained referring to the figures.

In the FIG. 1*a* there has been shown as an example directly from side the apparatus 100A of the equipment according to the invention that consists of the platform 1, the first auxiliary platform 2 connecting to the drive-in ramp 200 of the mentioned platform and the second auxiliary platform 3 connecting to the drive-out ramp 201. In FIG. 1*b*, the same setting has been shown directly from above. The mentioned auxiliary platforms have been connected, using joints n1-n4, to the platform 1 and the mentioned ramps in such a way that they can turn in relation to these joints as the platform 1 moves downwards when the mass 4 is placed resting on it. In this example, the mass 4 is a passenger car that is moved on the mentioned platform by driving. The platform 1 has been supported to the frame 101 of the apparatus 100A, in this example to its subsidiary construction, using pre-tensed springs 5 so that its position is stabile when the mass does not affect it. As the mass 4 is moved, that is in this example the car is driven through the first auxiliary platform 2 to the platform 1 the springs 5 get more loaded and get all pressed together because of the effect of the mass 4 the distance y of the movement of the platform and thus the setting is as shown in the FIG. 1*c*. The movement transfer organs 6 that have been fixed to the platform 1 that in this example are toothed racks lower with the platform the distance y and thus to the frame 101 supported wheels 7 that change the vertical movement into the rotation which wheels are gearwheels and they rotate the duration of the mentioned movement to the direction z. The movement of the platform 1 can be limited with limiters 8 to a certain depth.

In the FIG. 1*d* there has been presented an option how to come into this situation: the platform 1 and the first auxiliary platform 2 tilt as the joint n2 gets pressed downwards when the front wheels of a car roll along the mentioned auxiliary platform. So the movement transfer organs 6 that have been fixed to the platform 1 and made to move vertically move downwards in different pace with each other but are at the end of the first cycle as shown in the FIG. 1*c* horizontally in line with each other when the platform 1 rests upon the limiters 8. In the same way, all the springs 5 are pressed the same amount together and are in their shortest length. The axes 7.1 of the wheels 7 have been connected to the electricity generators in them or to the rotation generator transfer organs (not in the figures).

Alternatively, the apparatus 100A can be adapted to operate so that the platform 1 moves downwards in a horizontal position so that keeping this position is ensured by support organs supported to the frame 101, the functioning of which will be presented later. As the platform 1 reaches its lowest position and the springs their shortest length as shown in the FIG. 1*c* the mass 4 is removed from the platform, that is the car is driven away from it. After this, the second cycle of the round takes place: the spring power of the springs 5 pushes the platform 1 back to the starting position of the FIG. 1*a* and during the back movement the transfer movement organs 6 move the movement to the rotation of the wheels 7 from where it is transferred to the generators either as it is or changed in such a way that the generators rotate all the time to the same direction. This can be done among other things by a mechanism gearing that contains a gearwheel in its take-off point that changes the rotation direction.

The before presented application of the invention is continuous so that cars can be driven continuously through the apparatus 100A without stopping them and the equipments of the before mentioned apparatus 100A have been adapted to operate so that the limiters 8 at the lowest point of the platform 1 stop the movement if the weight of the mass 4 exceeds a certain limit. In this application, the cars can be driven into both directions but into the driving direction descending direction can be regarded more favorable.

The FIGS. 2*a*-2*c* present an apparatus 100B according to the invention, 2*a* and 2*c* directly from side and 2*b* directly from above. The platform 1 has been installed between the drive-in ramp 200 and the drive-out ramp 201 without auxiliary platforms. The pre-tensed springs 5 have been adapted to multifunction organs 20 that are 4 in number in this example. The springs 5 are in boxes 21 that have been fixed to the platform 1 which boxes are cylinders in this example and where there has also been put a guide 22 in each of them and its upper edge has been fixed to the frame 101 above the mentioned equipment. The springs 5 have been pre-tensed between the lids 21.1 and the flanges 22.1 of the guides in such a way that the platform 1 is positioned to the level of the drive-in ramp 200. The movement transfer organs 6 have been fixed to the platform 1 that are 4 in number in this example and the wheels 7 have been connected to them in such a way that the vertical movement of the platform 1 can be transferred to the mentioned wheels with the movement transfer organs 6 and can be changed into rotation there. Below the platform 1 that is in a stabile position and level with the drive-in ramp 200 there are the lock organs 10*a* that keep the platform in place until the beginning of the first cycle of the round. As the mass 4, that is the car, has been moved to the platform 1 the mentioned lock organs are opened and thus the mass 4 presses the platform downwards and the vertical movement of the movement transfer organs 6 is transferred to the wheels 7 and changed into rotation movement. At the same time, the springs 5 get pressed together and they store spring energy.

The FIG. 2*a* presents the setting before loading the platform 1 when it has been locked to its top position with the lock organs 10*a* and 2*c* at the end of the first cycle when the platform 1 is at the level of the drive-out ramp 201. In this phase the platform is locked, now using the lock organs 10*b* to its place for the time of removing the mass 4 from the platform 1 and thereafter the locking is opened. During the second cycle of the round the spring energy of the springs 5 lifts the platform back to its starting position, level with the drive-in ramp 200 and the return movement of the movement transfer organs 6 is transferred into rotation to the wheels 7. Even in this application, a reverser can be used that keeps the generator rotation direction the same all the time.

The before presented application of the invention operates one-way cyclically but in this application the transfer y can be made longer than in the continuous application of the invention.

In the FIG. 3*a* there has been presented the cross-section of the multipurpose organ 20. The box 21 that is a cylinder in this example has been fixed to the platform 1 and the guide 22 that is a round tube in this example has been fixed to the frame 101 of the apparatus. The pre-tensed spring 5 has been adapted between the lid 21.1 of the box and the flange 22.1 in the down part of the guide. The hollow inside 23 of the guide has been filled altogether using liquid 25 at least to the level of the lid 21.1 and the space between the box 21 and the guide, that is the spring space 24 has been fulfilled altogether with liquid 25. In the FIG. 3*b* there has been shown in more detail how the guide jacket down part has at least one opening 26 that connects the before mentioned liquid spaces. When the mass 4 has been positioned on the platform 1 and the locking of the lock organs 10*a* has been opened the gravity of the mass 4 tends to move the platform 1 downwards (arrow in platform 1) too fast in the situation but the liquid 25 in the spring space 24 limits the movement to the speed that the flow 27 through the openings 26 allows (arrow from out inwards). The area of the opening/s and the viscosity of the liquid can be used to regulate the flow speed of the liquid and thus the descent speed of the platform. When the empty platform 1 lock organs 10*b* have been opened and the spring power lifts the platform upwards the time of the second cycle of the round a vacuum tends to be formed in the spring space 24 and so liquid gets sucked from the inner space 23 into the spring space 24 through the openings 26. When the liquid surface level is in the starting position (FIG. 2*a*) in the inside space 23 at least at the level of the lid 21.1 the whole spring space 24 gets full of liquid before a new round begins. One duty of the multi function organ 20 in addition to previous ones is to support the spring 5 to stay stern and their mutual duty is to support the platform 1 to stay horizontal. This is helped by the fact that the boxes 21 and the guides 22 support each other in the sliding fit joints of the lid 21.1 and the flange 22.1.

The moving element E of the apparatuses 100A and 100B is the platform 1 and the stationary part is the frame 101. The movement transfer organ 6 can be adapted to either of these and the wheel 7 correspondently to the opposite part.

In the FIGS. 4*a*-4*d* there has been presented one different from previous ones apparatus 100C according to the invention. It can be seen from the FIG. 4*a* that to the surface 210 of the drive way, a button 30 of the mentioned apparatus has been adapted that has been installed slide fitted and sealed to the first cylinder 31. Another cylinder 32 has been connected to the lower part of the mentioned cylinder and inside it a tightened piston 33 has been slide fitted. Between the end of the second cylinder 32.1 and the other end of the piston 33.2 there has been located a pre-tensed spring 5 the spring power of which presses the first end of the piston 33.1 against the limiter 34. The lower part of the first cylinder has been filled with liquid 35 so that the highest point of top surface 30.1 of the button is a certain favorable distance h above the driveway surface 210.

In the FIG. 4*b* there has been presented the situation where one ends when one tire portion of the vehicle mass, that is mass 4, rolls upon the button 30. The button gets pressed into the first cylinder the distance h and thus under it the liquid 35 in the tight liquid space presses the piston 33 in the other cylinder 32 away from the first cylinder 31. Because the diameter D1 and the cross-section A1 of the first cylinder are larger than the diameter D2 and the cross-section A2 of the second cylinder the movement s of the piston 33 is longer than the press of the button, that is the movement h. A movement transfer organ 6 has been fixed to the piston rod 36 that is in the continuation of the piston 33 so that it can repeat the before described piston movement outside the other cylinder 32, in this example beside and under it. During the movement of the piston 33 the spring 5 gets more loaded and spring energy gets stored in it. The movement of the piston is transferred with the movement transfer organ 6 that is in this example a toothed rack into the wheel 7 where it is changed into rotation movement. The wheel 7 is in this example a gearwheel. The before described operation is the first cycle of the electricity production according to the invention.

When the mass 4 rolls away from the button 30 and the button gets freed the spring energy of the spring 5 presses the piston 33 back to the starting position of the setting (FIG. 4*a*) and so the liquid 35 relays the pressure power to the button 30 pressing it to the starting position of the setting. The return movement of the piston is relayed and changed during the second cycle of this turn with the movement transfer organ 6 to the wheel 7 either directly to a corresponding rotation movement or with the help or the reverser same direction as it is during the above described turn first cycle. The direction of the rotation movement can also be changed using a gear. A round is followed by another round etc.

All the before mentioned function organs are included in the apparatus 100C that has a case-like frame 37. The first and second cylinders 31, 32 and the wheel 7 have been supported to the frame in certain locations and positions in relation to it and the surface 210 of the driveway. In the FIG. 4*c* there has been described a view from the FIG. 4*b* situation directly from above the driveway. There has been located numerous apparatuses 100C in the driveway where there is a generator 38 connected to the axis 7.1 of each wheel 7 and the electricity thus obtained is fed into a battery. In here mentioned apparatus application the second cylinder 32 and the movement transfer organ 6 have been placed in a horizontal position so that when assembling the apparatus 100C their spacing and the frequency of the buttons 30 in the surface 210 of the driveway are defined by the length L and the width W of the apparatus, as stated in the mentioned figure.

In the application that has been shown in the FIG. 4*d* it has been intended to come to a setting where the frequency of the buttons 30 is denser. In this example the second cylinder 32 and the movement transfer organ 6 have been positioned vertically under the first cylinder 31. This application using the invention gives in comparison to the previous one (FIG. 4*c*) a greater efficiency but on the other hand this way realized apparatus requires a deeper installation depth in the constructions of the driveway. The liquid 35 as a conveyer of the movement makes it possible to position the second cylinder 32 and the movement transfer organ 6 almost in any position in relation to the first cylinder 31 without any additional mechanical arrangements.

As an example of the operation of the apparatus 100C it is presented that when the diameters D1 and D2 are 7 cm and 2.5 cm and the movement h 5 cm the movement s of the piston 33 and to it attached movement transfer organ 6 about 39 cm (38.5 $cm^2$×5 cm/4.9 $cm^2$). If the deal frame of the wheel 7 diameter D3 is 2.5 cm so one to and fro button 30 movement causes about 10 rotations of the wheel 5.

The moving element E of the apparatus 100C according to the invention consists of the button 30, liquid 35, the piston 35, the piston rod 36 together. The piston can also be made without a separate piston rod in which case the moving element consists of the three first mentioned. The first adapted part of the movement chain of the moving element E is in this example the button 30 and the last adapted part is the piston rod 36. The stationary part is the frame 37. The movement transfer organ 6 can be adapted either to the moving part or to the frame and the wheel correspondingly to the opposite part.

In FIGS. 5*a* and 5*b* there has been described the operation of the apparatus 100D according to the invention. The mentioned apparatus is in this example the shock absorber of a vehicle where the upper and lower parts move in relation to each other and which both move in relation to the surrounding during the operation but where the upper part is called in this example its moving part 40 and the part in relation to which the movement is created is called the frame 37. A movement transfer organ 6 has been fixed to the moving part and a wheel 7 to the frame so that the movement transfer organ and the wheel constitute a operation organ pair where the varying linear movements of the length y1 of the movement transfer organ in relation to the wheel 7 are transferred into rotation of the wheel. In these solutions, the movements y1 are of different duration so that height of the return movement during the second cycle is in accordance with the laws of the physics dependent on the mentioned movement. One movement of the moving part 40 to and fro in relation to the frame 37 is called also in this invention execution mode a turn that consists of two cycles the first of which loads the shock absorber spring as it gets compressed by a shock and the second unloads the spring energy of the spring 5 after the shock. In also this execution mode of the invention the generator 38 rotation movement can be kept all the time to the same direction with for instance a gear or any other known equipment.

The moving element E of the apparatus 100D according to the invention is in this example the upper part of the shock absorber and the stationary part is the frame 37. The movement transfer organ 6 can be adapted to either of these parts and the wheel 7 correspondingly to the opposite part.

In the FIGS. 6*a* and 6*b* there has been presented a principle figure about the apparatus 100E according to the invention. The apparatus has been adapted into a jump carpet so that its movement transfer organ 6 has been located to moving part 40 from its first end 6.1 and the wheel 7 has been supported to the frame 37 with the supports 41 that belong to it. The movement transfer organ and the wheel operate in the same way as earlier in the shock absorber that is when the shock hits the moving part the direct movement goes from the movement transfer organ 6 to its operation pair connected wheel 7 as a rotation movement.

In the FIG. 6*c* there has been presented the composition of the central operation parts about the setting of the FIG. 6*a* magnified and the FIG. 6*d* is a cutaway drawing from the level B-B of the FIG. 6*c* and that brings forth one application to support the movement transfer organ 6 and the wheel 7 to their places. There is a long vertical opening 6.2 in the movement transfer organ and through it there are two bolts 42 upon each other in different levels with a certain favorable distance from each other that have been fixed to supports 41 beside the movement transfer organ and the wheel in their different sides. Thus the movement transfer organ has been adapted to move back and forth under the vertically moving part 40. The construction of the moving part 40 constitutes in this application of the invention the spring 5 and the maximum dip of its center at the end of the first cycle of each turn is the movement y2 of the movement transfer organ. The height of the return movement that takes place during the second cycle is also in this solution dependent in accordance of the laws of physics on the mentioned movement. The wheel 7 has been locked to its axis 7.1 by for instance a crimped joint and the mentioned axis has been pillowed with the bearings 43 to the supports 41 and fixed by its end to the generator 38.

In all the before mentioned applications of the invention the axis 7.1 of the wheel can be pillowed to the organs that support it and its rotation movement is transferred to the generator 27 the electric power of which is stored to at least one battery.

The moving element E of the apparatus 100E according to the invention is in this example the moving part 40, that is the carpet and the stationary part is the frame 37. The movement transfer organ 6 can be adapted to any of these and the wheel 7 correspondingly to the opposite part.

In the FIG. 7 there is an example how to apply the invention in the gym equipments. In an equipment where one draws a bar with the hands downwards, that is the moving part 70, a strap, a chain or other corresponding movement transfer organ that has been attached to it is usually connected to the mass 4 through the rolls attached to the frame 37 of the equipment that gets lifted guided by the guides (not to be seen in the figure) during the mentioned movement. The strap, the chain etc operates in this application of the invention as the movement transfer organ 6 and it can be adapted to go round a roll that operates as a wheel 7 only a part of its circle or more than a round around it when the friction, toothing etc. prevents the sliding between the movement transfer organ and the wheel and as the mass 4 moves up and down the movement of the movement transfer organ 6 gets transferred to the wheel 7 rotation movement. In all mass 4 lifting operations in gyms where there is a strap, a chain, a rope etc. the apparatus parts according to the invention can be connected. In this and corresponding applications of the invention the energy to be transferred into the electricity is obtained during the first cycle of the turn from the gym-goers' muscle power and during the second cycle from the gravity directed to the mass 4. The axis of the wheel 7 has been connected to the gear 53 intake axis and its outtake axis to the generator 38. The resistance of the generator can be taken into account when planning the different values of the mass 4.

The moving element E in a gym equipment of the apparatus according to the invention in this application of the invention consists of the bar, that is the moving part 70, the strap, that is the movement transfer organ 6 and the mass 4 and the stationary part of the frame and the rolls 71 attached to it.

In the FIGS. 8*a*-8*d* there has been presented the invention operation mode where the electric power is produced from the hinge turn movement. In the FIG. 8*a* there is an upper hinge of a door 60 that is closed and the FIG. 8*b* the same door opened. It can be seen from the figures that the upper part of the hinge has been fixed to the door and the lower part to the frame 61 of the door. The apparatus 50 according to the invention has also been shown in the figure the parts of which the mentioned hinge parts are. The door and the door frame have been shaped in this example so that the apparatus can be adapted to their construction above the hinge location. In the FIGS. 8*c* and 8*d*, only the apparatus 50 has been shown. The lower part of the hinge 51 consists of a sleeve where there is a round hole 51.1 and a flange 51.2 that is attached to the frame 61 of the door. The upper part 52 of the hinge consists of hinge bolt 52.1 put into the hole 51.1 and another flange 52.2 that is attached to the door 60. Like this when the door is opened the mentioned hinge bolt turns. Additionally, the apparatus 50 consists of a gear 53 attached to the top of the hinge bolt and a generator 38 attached to its outtake. As the door 60 is opened the turning hinge bolt 52.1 turns with it the gear 53 intake axis. The gear has been adapted to multiply the angular velocity of the hinge bolt so that for instance opening the door once to 90 degree angle the generator 38 rotor rotates numerous times. Closing the door causes an opposite direction operation than before in the apparatus 50 and the rotation movement to the generator can be changed with a reverser to the same direction as when opening the door.

The moving element E of this application of the invention consists of the door 60 and the upper parts 52 of the hinges and the frame is the door frame 61. The generator 38 can also be connected to more than one hinge in one door.

In the FIG. 9 there has been shown the apparatus according to the invention where the electricity is produced from the rotation movement of the wheels of the shopping carts, warehouse carts etc. The electricity that has been produced with the help of the shopping carts can be used among other things in the mobile phone charging stands located in the carts. It can be seen in the figure that the cart 80 that in this application is the moving element E, a leg, a two part wheel 7 that has been attached to the leg, the gear 53 intake installed to the axis 7.1 that has been set to rotate and the generator 38 installed to the outtake. In the figure there has also been presented the support 81 that is used to support the gear and the generator to the wheel support construction. In this application of the invention the chassis 90, where the wheels 7 rotate functions as the movement transfer organ for them all. As the cart 80 is pushed the cart leg movement long rotation movement gets formed to the circles of the wheels 7. The gear 53 that has been installed to at least one wheel axis 7.1 multiplies the wheel rotation speed by the gear ratio and transfers the multiplied rotation movement to the generator 38. As the wheel 7 turns by the joint 82 the gear and the generator turn also with it.

The gear 53 can be used also in all the applications that have been presented in this document like in the last mention case so that the number of rotations from the wheel 7 to the generator 38 can be multiplied.

One application of the invention is to use the known carpet of the Finnish patent application 20215897 in connection with the apparatuses 100A-100C or 100D. In 100A and 100B it can be placed upon the platform 1 as shown in the FIGS. 1*d* and 1*n* 100C upon the buttons (as shown in the example of the FIG. 4*a*). The mentioned carpet the reference marking of which is M in this example and the figure contains air cells that compress when the mass 4 affects them from above. The air flow from the cells is led to the fan that rotates the generator and as the effect of the mass M ceases the vacuums formed in the cells suck air into them from the surrounding and their flexible constructions make it possible that their shape returns to original.

It is also possible to adapt a protective carpet M' upon the buttons 30 where there are not air cells. In this case, its purpose is to protect the buttons 30 and the first cylinders 31 against the mud and other dirt that comes with the wheels of the car. All the carpets M, M' help also in such a way that the wheel of the car not only hits the button 30 partly because the mentioned carpets distribute the effect of the gravity for a larger area.

The platform 1 can be shaped and adapted to the apparatus 100A, 100B in many different ways applying the characteristics of the invention that have been presented above.

The spring suspension can be realized with different springs 5. They can be for instance compression springs, draw spiral springs, or leaf springs and their amount in an apparatus according to the invention can be any favorable amount. Any favorable flexible material can also operate as the spring 5.

The movement transfer organ 6 and the wheel 7 can be realized in many different ways. All the operation organ pairs that are capable of transferring by an essentially direct or indirect movement, for instance an arched movement to the wheel 7 into a rotation movement realize the invention. The amount of these operation organ pairs can be chosen freely according to the situation.

The movement transfer organ 6 can be fixed to the platform 1 of the apparatus 100A-100E, to the piston 33 moving by the effect of the button 30, to the piston rod 36, to the moving part 40 or a corresponding organ or alternatively to the frame 101, 37. In the latter alternative the wheel 7 is fixed to the mentioned platform, piston, piston rod, or the moving part.

The operation of the lock organs 10*a*, 10*b* can be realized in any known way, manually or automatically.

The multi function organ 20 can be realized in many different ways so that it can take care of the spring suspension of the apparatus 100A and/or 100B, the support of the platform 1 and the stability of the movement or a part of these functions. As liquid 25, oil or some other suitable liquid can be used. Limiters 8 and/or lock organs 10*a*, 10*b* can be adapted to the multi function organs.

The shapes of the buttons 30, the pistons 33, and the cylinders 31, 32 of the apparatus 100C and the movements of the first mentioned can be realized following the standards and the individual situations in the limits that have been defined in the limits of the claims.

The shock absorption of the apparatus 100D can be that of a car, a lorry, a truck or a bus, a train, or a working machine.

It should be noticed that even though this description sticks to some for the invention favorable application examples this does not want to limit the application of the invention for only this type of examples but many variations are possible within the limits of definitions of the invention ideas of the claims.

The invention claimed is:

1. A method of producing electric energy from kinetic energy comprising at least the following operations performed repeatedly with the help of an apparatus:

a. a mass is configured to load a moving element of the apparatus, b. gravity acting on the mass is allowed to move the moving element over a certain movement length, c. during movement of the moving element, released potential energy is stored in at least two pre-tensed springs that are loaded by the moving element, d. the springs are configured to push the moving element back to a starting position after an effect of the mass ceases, e. at least one movement transfer organ fixed to the moving element or to a frame is configured to transfer the linear movement of the moving element into rotational movement of at least one wheel attached to the frame or to the moving element, f. the rotational movement of the at least one wheel is transferred directly or via a gear into a generator where the rotational movement is changed into electric energy, wherein:

g. the moving element of the apparatus comprises a platform configured for vertical reciprocating movement, wherein a plurality of multifunction organs are used in connection with the platform, each multifunction organ comprising a box attached to one of the platform and the frame, a guide attached to the other of the platform and the frame and extending into the box, a spring of the at least two pre-tensed springs arranged between a lid of the box and a flange at an end of the guide and a liquid disposed in the box, wherein each multifunction organ is configured to support the spring and guide movement of the platform together with the box, the guide, and the liquid to maintain the platform essentially horizontal during movement and to regulate a movement speed of the platform based on a flow speed of the liquid through an opening in the guide.

2. The method according to the claim 1 wherein the apparatus is used as for driving at one or more of a drive-in gate and a drive-out gate of a parking hall or a parking area.

3. The method according to claim 1 wherein all multifunction organs of the apparatus are matched to each other in order to make the platform operate essentially in a horizontal position.

4. The method according to claim 1 wherein the apparatus is used in a parking house to lower a car between floors.

5. The method according to claim 1 wherein a downward movement of the platform of the apparatus is limited by one or more limiters.

6. The method according to claim 1 wherein the at least two pre-tensed springs comprise draw or press spiral springs, leaf springs, or a flexible material.

7. The method according to claim 1 wherein the at least one movement transfer organ comprises a toothed rack, and the at least one wheel comprises a gearwheel.

* * * * *